United States Patent
Kumar et al.

(10) Patent No.: US 9,253,085 B2
(45) Date of Patent: Feb. 2, 2016

(54) HIERARCHICAL ASYMMETRIC MESH WITH VIRTUAL ROUTERS

(71) Applicants: Sailesh Kumar, San Jose, CA (US);
Eric Norige, East Lansing, MI (US);
Joji Philip, San Jose, CA (US);
Mahmud Hassan, San Carlos, CA (US);
Sundari Mitra, Saratoga, CA (US);
Joseph Rowlands, Alviso, CA (US)

(72) Inventors: Sailesh Kumar, San Jose, CA (US);
Eric Norige, East Lansing, MI (US);
Joji Philip, San Jose, CA (US);
Mahmud Hassan, San Carlos, CA (US);
Sundari Mitra, Saratoga, CA (US);
Joseph Rowlands, Alviso, CA (US)

(73) Assignee: NetSpeed Systems, San Jose, CA (US)

( * ) Notice: Subject to any disclaimer, the term of this patent is extended or adjusted under 35 U.S.C. 154(b) by 335 days.

(21) Appl. No.: 13/723,732

(22) Filed: Dec. 21, 2012

(65) Prior Publication Data
US 2014/0177473 A1    Jun. 26, 2014

(51) Int. Cl.
*H04L 12/775* (2013.01)
*H04L 12/715* (2013.01)

(52) U.S. Cl.
CPC .............. *H04L 45/58* (2013.01); *H04L 45/04* (2013.01)

(58) Field of Classification Search
None
See application file for complete search history.

(56) References Cited

U.S. PATENT DOCUMENTS

| | | |
|---|---|---|
| 5,432,785 A | 7/1995 | Ahmed et al. |
| 5,764,740 A | 6/1998 | Holender |
| 5,991,308 A | 11/1999 | Fuhrmann et al. |
| 6,003,029 A | 12/1999 | Agrawal et al. |
| 6,249,902 B1 | 6/2001 | Igusa et al. |
| 6,415,282 B1 | 7/2002 | Mukherjea et al. |
| 6,925,627 B1 | 8/2005 | Longway et al. |
| 7,065,730 B2 | 6/2006 | Alpert et al. |
| 7,318,214 B1 | 1/2008 | Prasad et al. |
| 7,590,959 B2 | 9/2009 | Tanaka |
| 7,725,859 B1 | 5/2010 | Lenahan et al. |
| 7,808,968 B1 | 10/2010 | Kalmanek, Jr. et al. |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Diane Lo
(74) *Attorney, Agent, or Firm* — Procopio, Cory, Hargreaves & Savitch LLP

(57) ABSTRACT

A network-on-chip configuration includes a first plurality of cores arranged in a two-dimensional mesh; a first plurality of routers, each of the first plurality of routers associated with a corresponding local one of the first plurality of cores, each of the first plurality of routers having a plurality of directional ports configured to provide connections to other ones of the first plurality of routers; a second plurality of cores disposed around a periphery of the two-dimensional mesh arrangement; and a second plurality of routers, each of the second plurality of routers associated with a corresponding local one of the second plurality of cores, and having a directional port configured to provide a connection to a neighboring one of the first plurality of routers.

15 Claims, 12 Drawing Sheets

(56) References Cited

U.S. PATENT DOCUMENTS

| | | | |
|---|---|---|---|
| 7,917,885 B2 | 3/2011 | Becker | |
| 8,050,256 B1 | 11/2011 | Bao et al. | |
| 8,059,551 B2 | 11/2011 | Milliken | |
| 8,099,757 B2 | 1/2012 | Riedl et al. | |
| 8,136,071 B2 | 3/2012 | Solomon | |
| 8,281,297 B2 | 10/2012 | Dasu et al. | |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2004/0216072 A1 | 10/2004 | Alpert et al. | |
| 2005/0147081 A1 | 7/2005 | Acharya et al. | |
| 2006/0161875 A1 | 7/2006 | Rhee | |
| 2007/0118320 A1 | 5/2007 | Luo et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0070726 A1 | 3/2009 | Mehrotra et al. | |
| 2009/0268677 A1 | 10/2009 | Chou et al. | |
| 2009/0313592 A1 | 12/2009 | Murali et al. | |
| 2010/0040162 A1 | 2/2010 | Suehiro | |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0154282 A1 | 6/2011 | Chang et al. | |
| 2011/0235531 A1* | 9/2011 | Vangal et al. | 370/252 |
| 2011/0276937 A1 | 11/2011 | Waller | |
| 2011/0307734 A1* | 12/2011 | Boesen et al. | 714/3 |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0110541 A1 | 5/2012 | Ge et al. | |
| 2012/0155250 A1 | 6/2012 | Carney et al. | |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0136129 A1* | 5/2013 | Locatelli et al. | 370/392 |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0182606 A1* | 7/2013 | So et al. | 370/254 |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0326458 A1 | 12/2013 | Kazda et al. | |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, F, et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

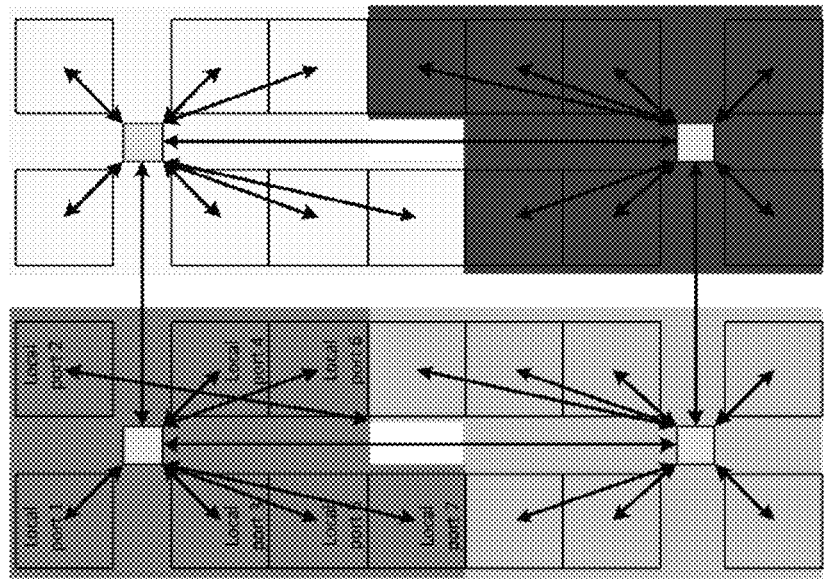
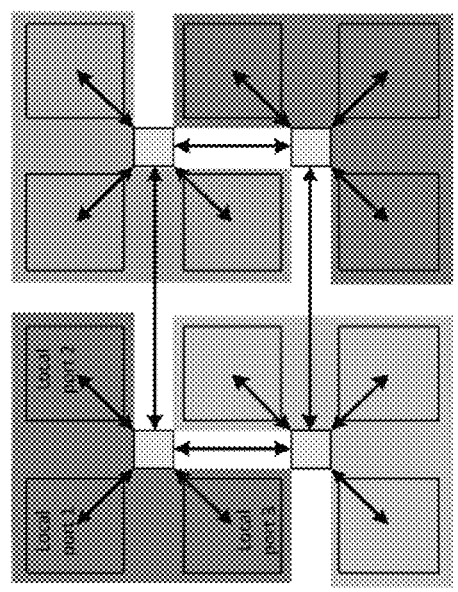
FIG. 7(b)
FIG. 7(a)

HIERARCHICAL ASYMMETRIC MESH WITH VIRTUAL ROUTERS

BACKGROUND

1. Technical Field

Methods and example embodiments described herein are generally directed to interconnect architecture, and more specifically, to network on chip system interconnect architecture.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both systems the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides it to the destination. For the remainder of the document, terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several possible topologies in which the routers can connect to one another to create the system network. Bi-directional rings (as shown in FIG. 1(a)) and 2-D mesh (as shown in FIG. 1(b)) are examples of topologies in the related art.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities which might exist in the underlying network. However, such deterministic routing may be simple to implement in hardware, maintains packet ordering and may be easy to render free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2D mesh networks.

FIG. 2 illustrates an example of XY routing in a two dimensional mesh. More specifically, FIG. 2 illustrates XY routing from node '34' to node '00'. In the example of FIG. 2, each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects often employ wormhole routing, wherein, a large message or packet is broken into small pieces known as flits (also referred to as flow control digits). The first flit is the header flit which holds information about this packet's route and key message level info along with payload data and sets up the routing behavior for all subsequent flits associated with the message. Optionally, one or more body flits follows the head flit, containing the remaining payload of data. The final flit is the tail flit which in addition to containing the last payload also performs some book keeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

A standard n×m mesh NoC can connect n×m cores and the maximum latency of n×m mesh NoC is n+m−1 hops, when the hosts at the two far end corners inter-communicate. To minimize the latency n and m must be chosen to be as close as possible, creating a more square like topology. In this case, as the network scales in size, the maximum latency is on the order of $n^{1/2}$, where n is the total number of nodes in the NoC.

SUMMARY

The present inventive concept provides for construction of a mesh based system interconnect that uses two key topology optimizations, namely virtual nodes, and hierarchical asymmetric mesh, to reduce the latency in number of hops compared to a standard mesh. An exemplary process to construct such mesh based system interconnects having lower latency in number of hops than a standard mesh is also provided.

Aspects of the present application may include a method, which involves, for a network on chip (NOC) configuration including a plurality of cores interconnected by a plurality of routers in a mesh arrangement, generating a plurality of virtual routers configured to connect ones of the plurality of routers having one or more unused ports; and configuring each of the plurality of virtual routers to connect to an unused port of a router from the ones of the plurality of routers having the one or more unused ports.

Aspects of the present application may include a computer readable storage medium storing instructions for executing a process. The instructions may involve, for a network on chip (NOC) configuration including a plurality of cores interconnected by a plurality of routers in a mesh arrangement, generating a plurality of virtual routers configured to connect ones of the plurality of routers having one or more unused ports; and configuring each of the plurality of virtual routers to connect to an unused port of a router from the ones of the plurality of routers having the one or more unused ports.

Aspects of the present application may include a method, which involves constructing a plurality of clusters, each of the clusters including a single router; for at least one of the plurality of clusters, connecting one or more cores to the single router of the at least one of the plurality of clusters; and connecting said single router of a first one of the plurality of clusters to said single router of a second one of the plurality of clusters.

Aspects of the present application may include a computer readable storage medium storing instructions for executing a process. The instructions may involve constructing a plurality of clusters, each of the clusters including a single router; for at least one of the plurality of clusters, connecting one or more cores to the single router of the at least one of the plurality of clusters; and connecting said single router of a first one of the plurality of clusters to said single router of a second one of the plurality of clusters.

BRIEF DESCRIPTION OF THE DRAWINGS

FIG. 6(*b*) illustrates a hierarchical mesh according to a second example embodiment;

FIG. 7(*a*) illustrates a hierarchical mesh according to another example of the second embodiment;

FIG. 7(*b*) illustrates a hierarchical mesh according to an yet another example of the second embodiment;

DETAILED DESCRIPTION

Figure 1B:
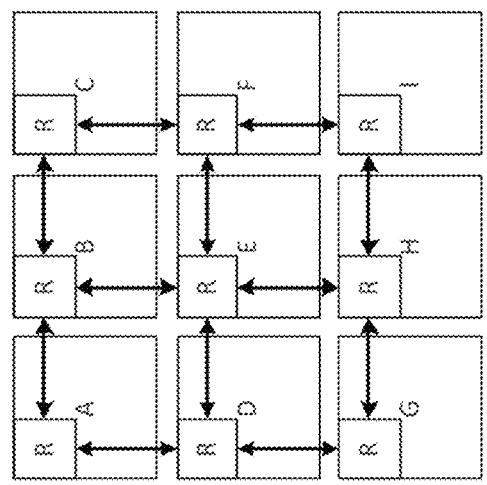
FIG. 1(*a*) and FIG. 1(*b*) illustrate Bidirectional Ring and 2D Mesh NoC Topologies.
Figure 1A:
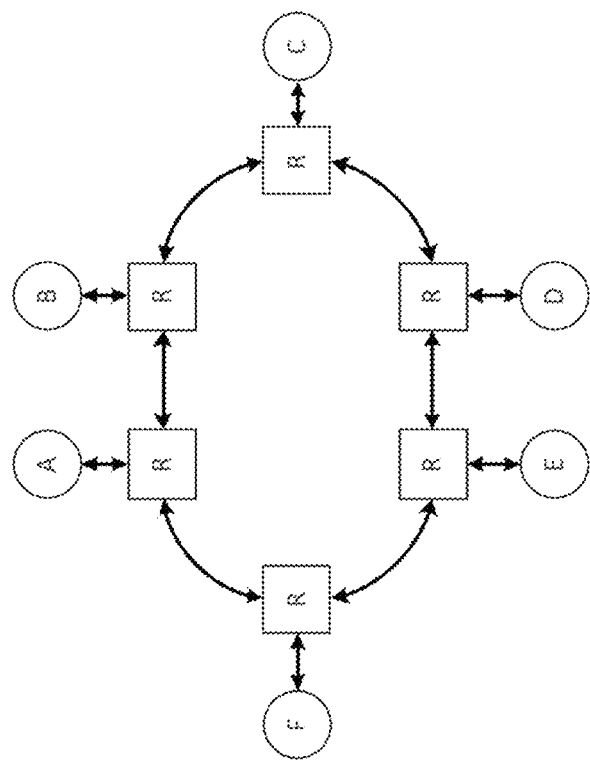
Figure 2:
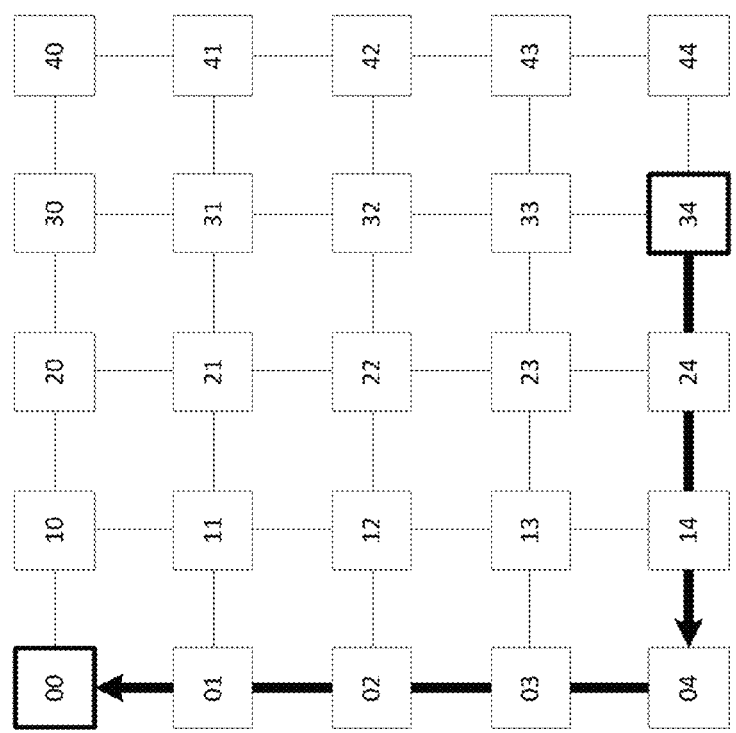
FIG. 2 illustrates an example of XY routing in a two dimensional mesh.
Figure 3:
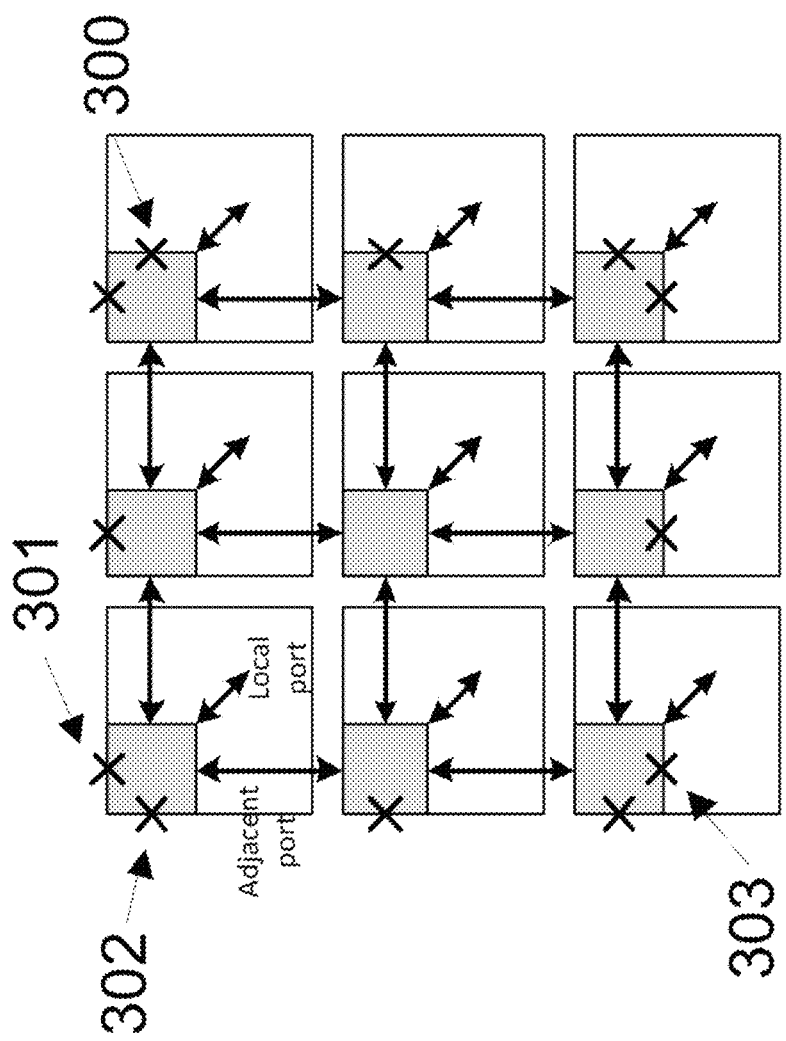
FIG. 3 illustrates a 3×3 2D Mesh NoC Topology connecting nine cores using nine router nodes according to an example of a first embodiment.

FIG. 3 illustrates a 3×3 2D Mesh NoC Topology connecting nine cores using nine router nodes. As used herein, a core may refer to any block of circuitry included as part of a network-on-chip. In this standard mesh, each router has up to five ports, four directional ports connecting to up to four adjacent routers, and one local port connecting to the local core. A local core is a core connected directly to a local port of a router. The routers that are neither at the top, bottom, left or right boundaries of the topology, will have all four direction ports connected to adjacent routers, however routers at the boundary will have certain ports unconnected. Routers at the top boundary will have their top directional port unconnected as indicated by 301 in FIG. 3. Routers at the bottom boundary will have their bottom directional port unconnected as indicated by 303 in FIG. 3. Routers at the right boundary will have their right directional port unconnected as indicated by 300 in FIG. 3. Routers at the left boundary will have their left directional port unconnected as indicated by 302 in FIG. 3. Routers at the four corners belong to two boundaries and therefore two of their directional ports are unconnected. Therefore, in this 3×3 mesh, a total of 12 directional ports are unconnected. In general in an n×m mesh, a total of 2n+2m ports will be unconnected.

Figure 4:
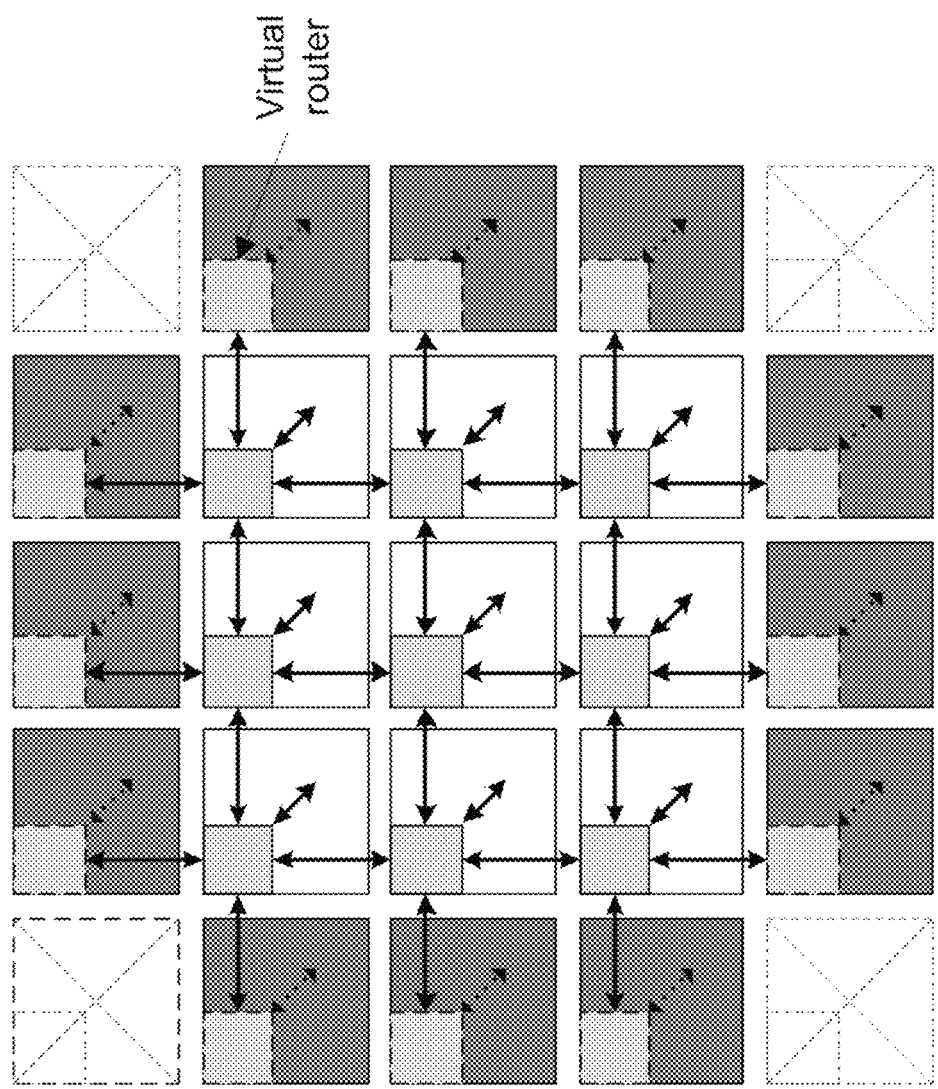
FIG. 4 illustrates virtual routers added at the mesh boundary and connected to the unconnected boundary ports of the original routers at the mesh boundary according to another example of the first embodiment.

The present inventive concept augments the standard mesh topology with virtual routers. Consider a case where we add additional routers at the mesh boundary and connect them to the unconnected boundary ports of the original routers at the mesh boundary, thereby expanding a n×m mesh to a (n+2)×(m+2) mesh as illustrated in FIG. 4. Notice that the resulting mesh has (n+2)×(m+2)−4 nodes in it as there are no nodes present at the four corners. Each additional router at the four boundaries is only connected to the neighboring router in the original mesh. Each additional router does have a local port so that a core can be connected to it. Thus, these additional routers have only two ports, one to connect to a local core and another to connect to a single router, which means each additional router is just an intermediate point between the core and the single router to which it is connected. If U-turns in the network are not allowed, then these routers do not need to perform any arbitration, and they can be replaced with a register and flow control logic, or may even be removed altogether. Therefore, these routers are referred to as virtual routers. From a hardware perspective, the additional cores connected to virtual routers will be either directly connected to an original router's unused port or connected to the original router via a register stage.

With virtual routers, the unused router ports of a standard mesh are utilized more effectively, thereby increasing the number of cores than can be connected to a n×m mesh from n×m to (n+2)×(m+2)−4. The maximum latency in number of hops remains the same as the original mesh, which is n+m−1. Thus, for a given number of cores that needs to be connected with mesh NoC, virtual routers can reduce the latency as well as the number of routers needed compared to a standard mesh. For example, to connect 21 nodes to a 5×5 standard mesh, at least 21 routers are needed, and maximum latency will be 5+5−1=9 hops. With virtual router support, we need a 3×3 original NoC mesh with 12 additional virtual routers, thus reducing the hardware cost to 9 routers, and latency to 3+3−1=5 hops.

Using virtual routers affects the routing. First, the number of bits needed to represent a node ID needs to be expanded. In a 3×3 standard mesh NoC, a node can be identified with 4-bit ID, 2 bits for an x-coordinate and 2 bits for a y-coordinate (assuming dimension based ID, which is useful in dimension ordered routing). With virtual routers, the dimension order will become 5×5, and with dimension based ID, we will need 3 bits for the x-coordinate and 3 bits for the y-coordinate to identify all nodes in the system. Routing needs to be done looking at the expanded node IDs. Second, when a virtual node receives and transmits a message, then a fixed dimension ordered route which is often used in a standard mesh cannot always be taken. In dimension ordered routing, routing is performed along the X or Y axis until the x- or y-coordinate of the destination node ID is reached, and then a single turn is made and the route is traversed along the other axis.

Figure 5:
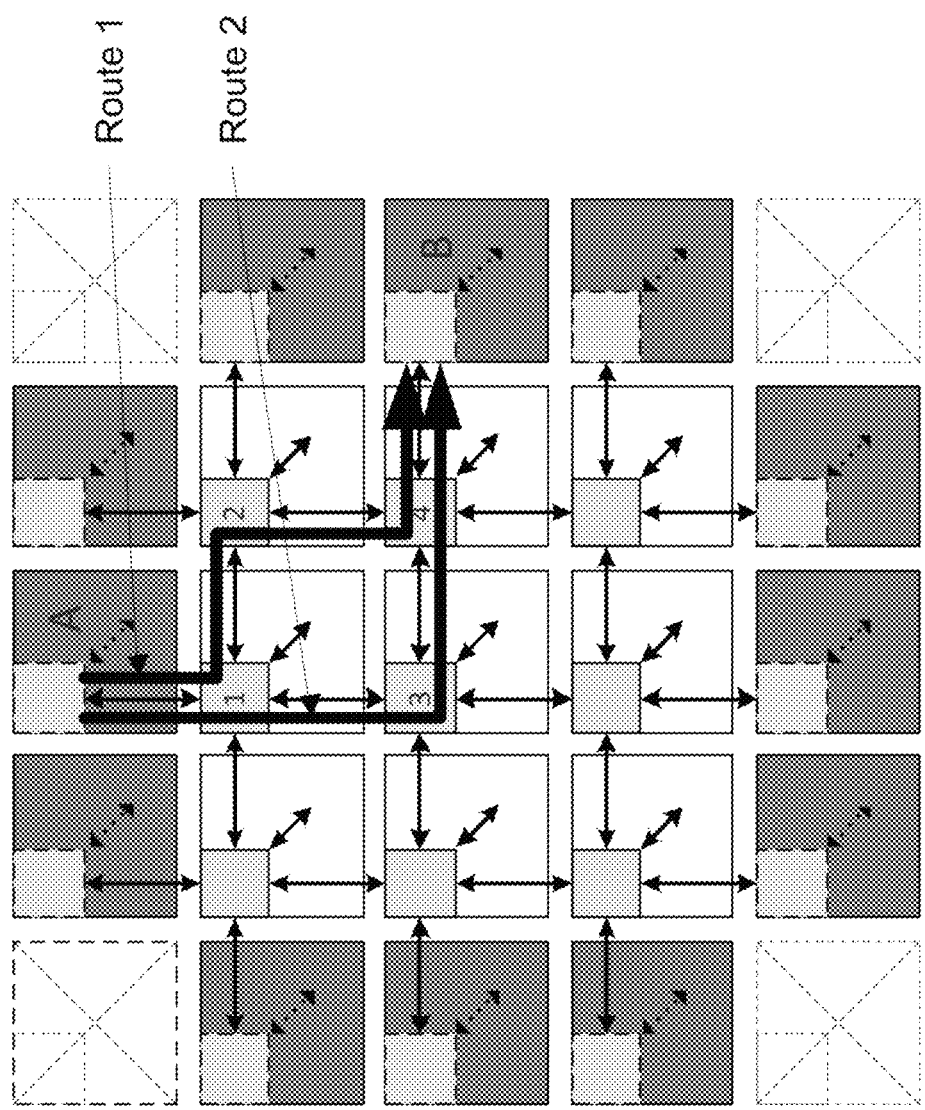
FIG. 5 illustrates message paths routed from a virtual routers added at the mesh boundary according to another example of the first embodiment.

Consider a mesh designed such that all messages take an X-Y route, i.e. messages first traverse along X-axis, take a turn, and then traverse along Y-axis to reach to the destination. The default routing circuit at all routers upon receiving a message at any input port, looks up the destination ID, and forwards the message along the X-axis towards the destination if the x-coordinate of the destination router is not the same as the x-coordinate of the router, else along the Y-axis towards the destination. If we use virtual routers as illustrated in FIG. 5, then there is no available X-Y route from node A to node B. Two possible paths are illustrated in FIG. 5. Path 1 needs multiple turns: first a Y-X turn, then an X-Y turn, and finally an X-Y turn again before reaching the destination node. Path 2 takes a single Y-X turn. Thus, special circuitry will be needed to handle these messages. In path 1, the first turn does not need any special circuitry, because node A is directly connected to the router 1 physically, and router 1 will treat a message arriving from node A as a regular message arriving on its top directional port, and the default X-Y routing circuit will turn the message to the right. When the message reaches router 2, it cannot continue as there are no more routers on the right, and it must make X-Y turn, which will need special circuitry. In path 2, router 1 needs special circuitry to not perform an X-Y turn which is what the default routing circuit of router 1 will do.

Figure 11:
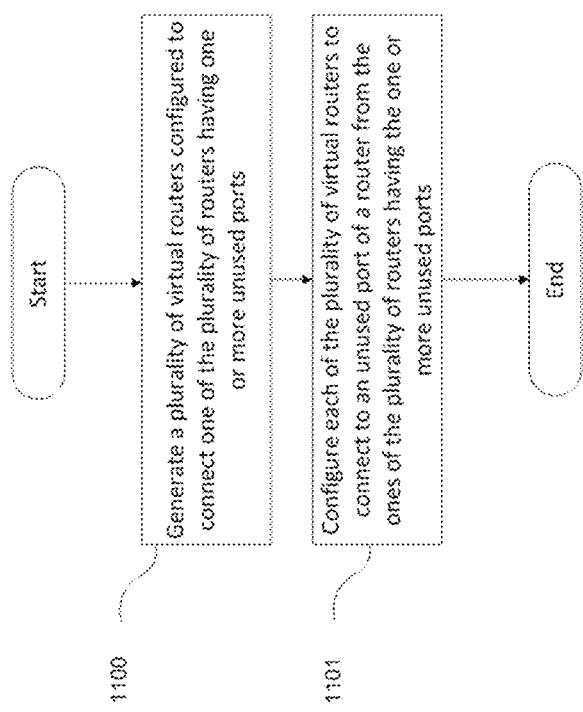
FIG. 11 is a flow chart illustrating a method of generating a plurality of virtual routers, in accordance with an example implementation.

The present inventive concept uses multi-turn based routing in a mesh NoC that may have virtual routers. FIG. 11 is a flow chart illustrating a method of routing messages according to an example embodiment. In multi-turn based routing, a list of straight paths (number of hops) and turns between these paths that leads to the destination are presented (S1100). The number of turns allowed is limited to some constant number (S1110). This constant will determine the amount of information that messages must carry as header information to be able to get routed correctly (S1120). Routers will have logic to interpret the information and correctly move the message forward, making the appropriate turns.

As an example, consider the case where up to three turns in the path are allowed. The turn can be encoded using 2 bits which indicate the direction of the next path. To encode the path length, the number of bits depends upon the longest straight path, e.g. for a mesh NoC of n×n original routers, we need ceiling($\log_2$(n+1)) bits; n+1 is used instead of n because there can be one additional virtual router along the longest path. The turn and path length information will repeat three times to describe the entire path as shown below:
(first turn) (path length) (second turn) (path length) (third turn) (path length)

For a 3×3 original mesh with virtual routers (which can now connect up to 21 cores), this will need total of 12 bits to support up to three turns. When path contains less than three turns the unused paths lengths can be set to zero.

To summarize, using virtual routers reduces the latency in number of hops and may utilize the unused router ports of boundary routers more efficiently.

Another inventive concept referred to as a hierarchical mesh is provided to reduce the number of hop latency in a mesh NoC. Hierarchical mesh is orthogonal to virtual routers, and it will be presented in the context of a standard mesh (without virtual routers).

Figure 6B:
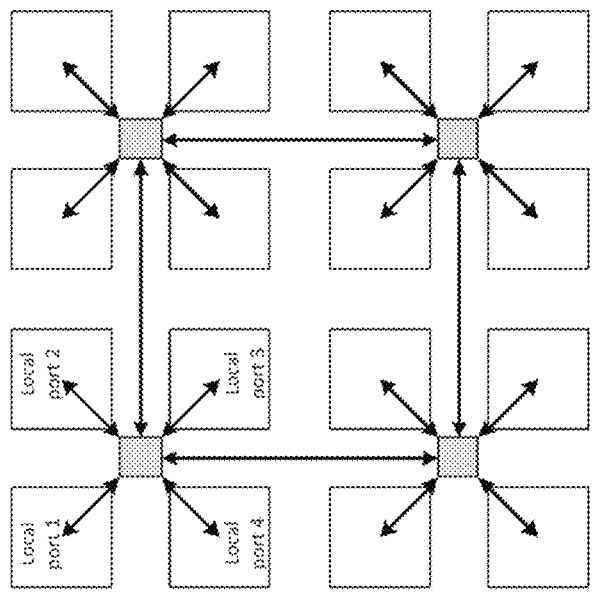
FIG. 6(*a*) illustrates a 4×4 standard mesh.
Figure 6A:
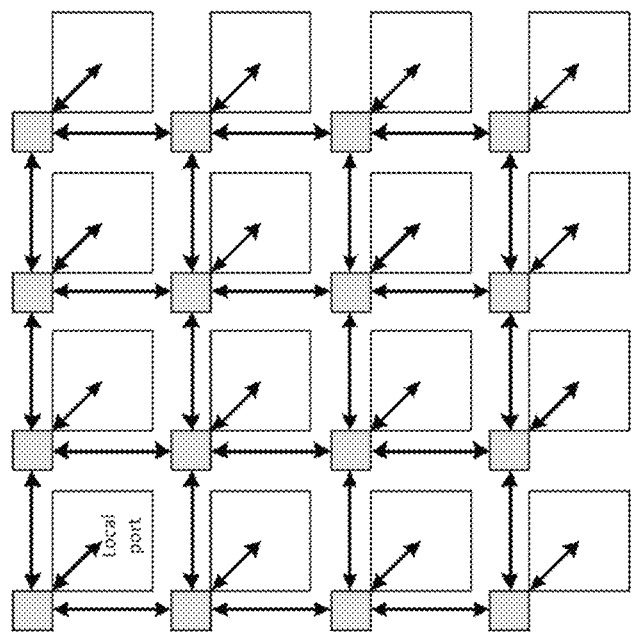

Consider a 4×4 standard mesh as illustrated in FIG. 6(a). One router is provided per core, and each router has five ports of which one is connected to the local core. A local core is a core connected directly to a local port of a router. Referring to FIG. 6(b), hierarchical mesh increases the radix of the router to more than (or equal to) five ports and besides the four standard directional ports, uses the remaining ports to connect to the local cores. Thus, with radix x(x≥5), we can connect up to x−4 cores at every router, thereby using less routers to connect more cores. In FIG. 6(b) we show an example where the router radix is 8, and four ports at every router are connected to the four local cores. Thus, with four routers, we connect 16 cores. We also reduce the maximum latency to three hops. With higher radix, the routers may operate at relatively lower clock frequency; however this can be addressed with smarter design and deeper pipeline.

In hierarchical mesh, since there may be multiple ejection ports at a router connected to the local cores, the multi-turn route information in messages also need to contain the output port ID at the last router along the path. If up to four cores are connected at a router then a 2-bit ejection port ID needed as part of the route information.

A hierarchical mesh is easy to place on a 2D chip, as illustrated by FIG. 6(b). Even for randomly chosen router radix values, the placement is straightforward. Examples with router radix 7 (thus 3 local ports), and radix 11 (thus 7 local ports) are illustrated in FIG. 7(a) and FIG. 7(b) connecting 12 cores in a 2×2 mesh, and 28 cores in a 2×2 mesh, respectively. While the NoC in these examples are 2×2, the cores are arranges in 4×3 and 4×7 organization. In FIG. 7(a), three neighboring cores form a local cluster and each of them are connected to a single router, giving total 4 clusters connected with 4 routers, which are connected with each other using standard directional ports. In FIG. 7(b), seven neighboring cores form a local cluster. In general the disclosed invention allows a finite number of nearby cores to form a local cluster. All cores within a cluster are connected to a single router. The cluster size is determined by the router radix, or vice-versa. Once all clusters are formed, the routers of each cluster are connected with each other using a mesh topology.

Figure 8:
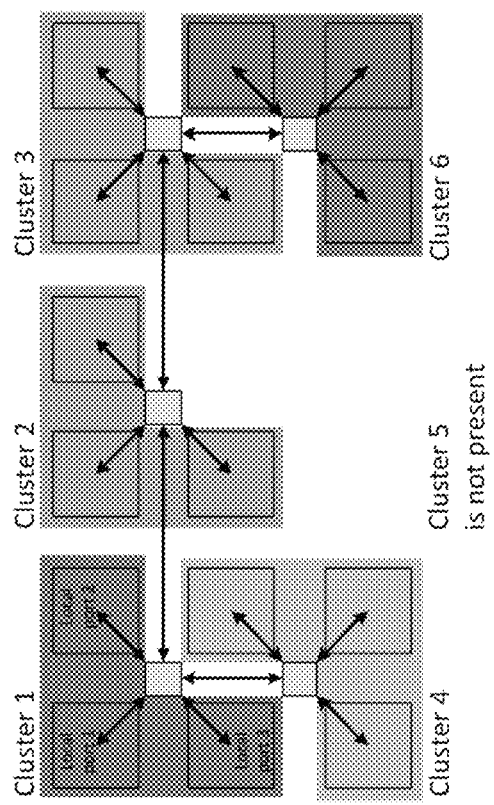
FIG. 8 illustrates a hierarchical partial mesh with asymmetric cluster size according to an yet another example of the second embodiment.

The present inventive concept allows formation of partial mesh as well, wherein some clusters and routers of a full mesh may be omitted. In such cases, dimension ordered routing cannot be used, and multi-turn based routing may need to be used. FIG. 8 illustrates such a partial hierarchical mesh topology, where each cluster contains three cores, and a 3×2 mesh connects only five clusters instead of standard six clusters. Cluster 5 does not exist in this case.

Figure 9:
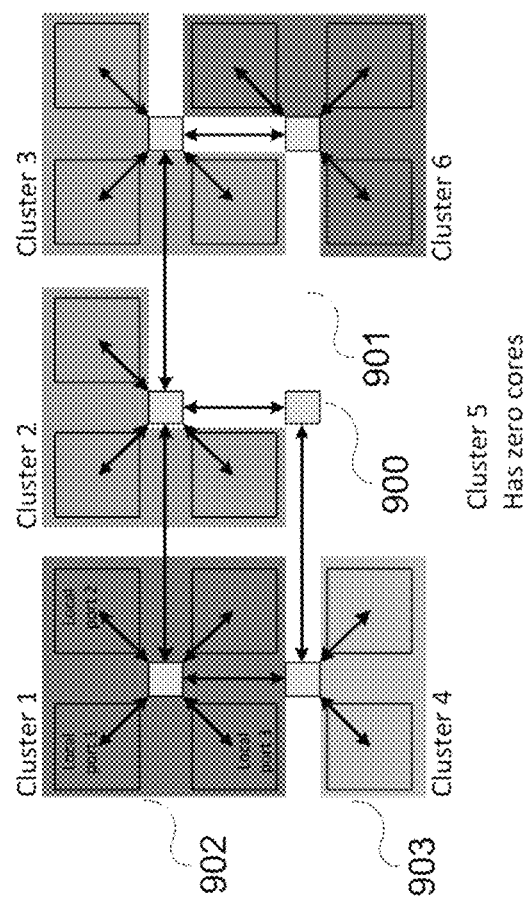
FIG. 9 illustrates a hierarchical partial mesh with asymmetric cluster size according to an still another example of the second embodiment.

Each cluster may contain a different number of cores, based on which the radix of the router connecting cores within the cluster can be chosen. This leads to asymmetric clusters in a hierarchical mesh. A cluster is allowed to contain zero cores, in which case the router of the cluster will become a transit router, i.e., it will participate in message routing like normal routers, however will never inject or eject a new message in the network. Furthermore some inter-router links of the mesh may be omitted in which case alternative paths may need to be taken when standard path does not exist between a source and destination router. An example of hierarchical partial mesh with asymmetric cluster size, a transit router, and some omitted links is illustrated in FIG. 9. Here, element 900 shows a transit router to which no cores are connected directly. It can be viewed as a cluster with zero cores. At element 901, a standard link of the mesh connecting the transit router and router of cluster 6 is omitted. Elements 902 and 903 show clusters of different sizes, cluster 1 containing four cores and cluster 4 containing two cores.

Figure 10:
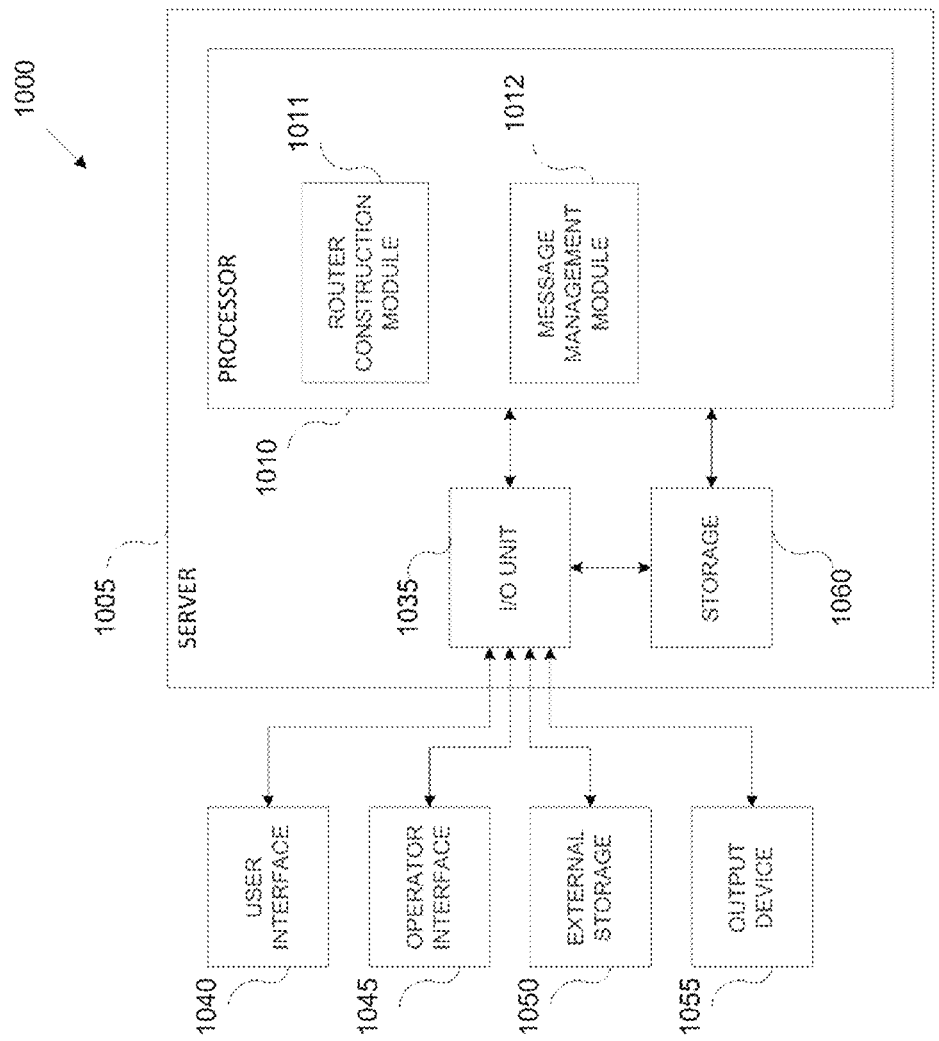
FIG. 10 illustrates a processor system to implement the presented example embodiments.

FIG. 10 illustrates an example computer system 1000 on which example embodiments may be implemented. The computer system 1000 includes a server 1005 which may involve an I/O unit 1035, storage 1060, and a processor 1010 operable to execute one or more units as known to one of skill in the art. The term "computer-readable medium" as used herein refers to any medium that participates in providing instructions to processor 1010 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 1040 and operator interfaces 1045 which may utilize input devices such as a keyboard, mouse, touch device, or verbal command.

The server 1005 may also be connected to an external storage 1050, which can contain removable storage such as a portable hard drive, optical media (CD or DVD), disk media or any other medium from which a computer can read executable code. The server may also be connected an output device 1055, such as a display to output data and other information to a user, as well as request additional information from a user. The connections from the server 1005 to the user interface 1040, the operator interface 1045, the external storage 1050, and the output device 1055 may via wireless protocols, such as the 802.11 standards, Bluetooth® or cellular protocols, or via physical transmission media, such as cables or fiber optics. The output device 1055 may therefore further act as an input device for interacting with a user.

The processor 1010 may execute one or more modules. A router construction module 1011 may be configured to, for a network on chip (NOC) configuration involving a plurality of cores interconnected by a plurality of routers in a mesh arrangement, generate a plurality of virtual routers configured to connect ones of the plurality of routers having one or more unused ports; and configure each of the plurality of virtual routers to connect to an unused port of a router from the ones of the plurality of routers having the one or more unused ports. The router construction module 1011 may be further configured to configure each of the plurality of virtual routers with at least one of a register and a flow control logic between a host port and a router port of the virtual router, and a pass through logic facilitating a direct connection between the host port and the router port of the virtual router. The router construction module 1011 may also be further configured to connect a host to one of the plurality of virtual routers connected to a previously unused port of one of the plurality of routers.

The router construction module 1011 may also be further configured to construct a plurality of clusters, each of the clusters having a single router; for at least one of the plurality of clusters, connecting one or more cores to the single router of the at least one of the plurality of clusters; and connecting said single router of a first one of the plurality of clusters to said single router of a second one of the plurality of clusters.

The message management module 1012 may be configured to route a message through the NOC configuration by using multi-turn based routing in the mesh arrangement. The routing of the message may involve limiting a number of turns for the message and determining a path in the mesh arrangement based on the limiting.

FIG. 11 is a flow chart illustrating a method of generating a plurality of virtual routers, in accordance with an example implementation. At 1100, for a network on chip (NOC) configuration having a plurality of cores interconnected by a plurality of routers in a mesh arrangement, a plurality of virtual routers configured to connect ones of the plurality of routers having one or more unused ports is generated. At 1101, each of the plurality of virtual routers is configured to connect to an unused port of a router from the ones of the plurality of routers having the one or more unused ports.

Figure 12:
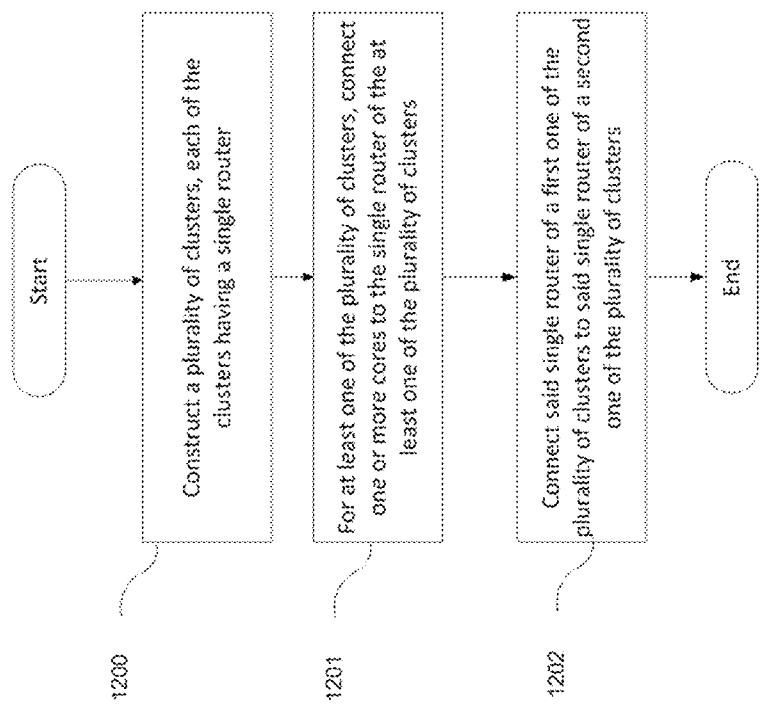
FIG. 12 is a flow chart illustrating a method of constructing a plurality of clusters with a single router for each cluster, in accordance with an example implementation.

FIG. 12 is a flow chart illustrating a method of constructing a plurality of clusters with a single router for each cluster, in accordance with an example implementation. At 1200, a plurality of clusters is constructed, with each cluster having a single router. At 1201, for at least one of the plurality of clusters, one or more cores is connected to the single router of at least one of the plurality of clusters. At 1202, the single router of a first one of the plurality of clusters is connected to a single router of a second one of the plurality of clusters.

To summarize, the inventive concept allows formation of hierarchical mesh, where clusters of one or more cores are directly connected to a local router, and the routers are connected in a mesh topology. Different clusters may contain different number of cores. There may exist transit routers, i.e., clusters with zero cores. Some clusters and routers of a standard full mesh may be omitted, and some standard inter-router links may also be omitted. Routing that takes a finite number of turns (between zero and a fixed constant) is used to provide the required connectivity.

What is claimed is:

1. A method, comprising:
   for a network on chip (NOC) configuration comprising a plurality of cores interconnected by a plurality of routers in a mesh arrangement, generating a plurality of virtual routers configured to connect ones of the plurality of routers having one or more unused ports; and
   configuring each of the plurality of virtual routers to connect to an unused port of a router from the ones of the plurality of routers having the one or more unused ports.

2. The method of claim 1, wherein a host is connected to one of the plurality of virtual routers connected to a previously unused port of one of the plurality of routers.

3. The method of claim 1, further comprising configuring each of the plurality of virtual routers with at least one of a register and a flow control logic between a host port and a router port of the each of the plurality of the virtual routers, and a pass through logic facilitating a direct connection between the host port and the router port of the each of the plurality of the virtual routers.

4. The method of claim 1, further comprising routing a message through the NOC configuration by using multi-turn based routing in the mesh arrangement.

5. The method of claim 4, further comprising limiting a number of turns for the message and determining a path in the mesh arrangement based on the limiting.

6. A non-transitory computer readable storage medium storing instructions for executing a process, the instructions comprising:
   for a network on chip (NOC) configuration comprising a plurality of cores interconnected by a plurality of routers in a mesh arrangement, generating a plurality of virtual routers configured to connect ones of the plurality of routers having one or more unused ports; and
   configuring each of the plurality of virtual routers to connect to an unused port of a router from the ones of the plurality of routers having the one or more unused ports.

7. The non-transitory computer readable storage medium of claim 6, wherein a host is connected to one of the plurality of virtual routers connected to a previously unused port of one of the plurality of routers.

8. The non-transitory computer readable storage medium of claim 6, wherein the instructions further comprise configuring each of the plurality of virtual routers with at least one of a register and a flow control logic between a host port and a router port of the each of the plurality of the virtual routers, and a pass through logic facilitating a direct connection between the host port and the router port of the each of the plurality of the virtual routers.

9. The non-transitory computer readable storage medium of claim 6, wherein the instructions further comprise routing a message through the NOC configuration by using multi-turn based routing in the mesh arrangement.

10. The non-transitory computer readable storage medium of claim 9, wherein the instructions further comprise limiting a number of turns for the message and determining a path in the mesh arrangement based on the limiting.

11. An apparatus, comprising:
   a processor, configured to:
      for a network on chip (NOC) configuration comprising a plurality of cores interconnected by a plurality of routers in a mesh arrangement, generate a plurality of virtual routers configured to connect ones of the plurality of routers having one or more unused ports; and
      configure each of the plurality of virtual routers to connect to an unused port of a router from the ones of the plurality of routers having the one or more unused ports.

12. The apparatus of claim 11, wherein a host is connected to one of the plurality of virtual routers connected to a previously unused port of one of the plurality of routers.

13. The apparatus of claim 11, wherein the processor is configured to configure each of the plurality of virtual routers with at least one of a register and a flow control logic between a host port and a router port of the each of the plurality of the virtual routers, and a pass through logic facilitating a direct connection between the host port and the router port of the each of the plurality of the virtual routers.

14. The apparatus of claim 11, wherein the processor is configured to route a message through the NOC configuration by using multi-turn based routing in the mesh arrangement.

15. The apparatus of claim 14, wherein the processor is configured to limit a number of turns for the message and determining a path in the mesh arrangement based on the limiting.

* * * * *